United States Patent [19]

Evans et al.

[11] 4,302,033
[45] Nov. 24, 1981

[54] DUAL-SEAL ROTARY FLUID COUPLING

[75] Inventors: Richard A. Evans, Plymouth; Robert F. Rasmussen, Minneapolis, both of Minn.

[73] Assignee: Honeywell, Inc., Minneapolis, Minn.

[21] Appl. No.: 79,930

[22] Filed: Sep. 28, 1979

[51] Int. Cl.³ .............................................. F16L 55/00
[52] U.S. Cl. ...................................... 285/14; 285/61; 285/93; 285/98; 285/175; 285/277
[58] Field of Search ...................... 285/96, 98, 93, 277, 285/281, 13, 14, 175, 61; 277/DIG. 6

[56] References Cited

U.S. PATENT DOCUMENTS

| 2,699,960 | 1/1955  | Cullery et al. | 285/13     |
| 2,797,108 | 6/1957  | Royer          | 285/281 X  |
| 3,089,713 | 5/1963  | Scaramulli     | 285/14     |
| 3,612,577 | 10/1971 | Pope et al.    | 285/14     |
| 3,802,456 | 4/1974  | Wittgenstein   | 285/93 X   |
| 3,884,511 | 5/1975  | Hermanson      | 285/98     |
| 3,889,983 | 6/1975  | Freize et al.  | 285/98 X   |
| 3,932,008 | 1/1976  | McCloskey      | 477/DIG. 6 |
| 3,937,494 | 2/1976  | Ailks          | 285/281 X  |
| 3,996,789 | 12/1976 | Wilson         | 285/93     |
| 4,006,920 | 2/1977  | Sadler         | 285/14 X   |
| 4,050,701 | 9/1977  | Webb           | 277/DIG. 6 |

FOREIGN PATENT DOCUMENTS

| 226008  | 12/1959 | Australia         | 285/96 |
| 2329124 | 1/1974  | Fed. Rep. of Germany | 285/98 |
| 1536683 | 12/1978 | United Kingdom    | 285/96 |

Primary Examiner—Dave W. Arola
Attorney, Agent, or Firm—Charles G. Mersereau

[57] ABSTRACT

A rotary fluid coupling for use with such devices as tracking concentrating solar collectors is disclosed which is capable of providing excellent sealing characteristics over a wide temperature range at relatively low internal fluid pressures. The coupling includes a stationary body member which defines an internal fluid passage operating in conjunction with a conduit member one end of which is received the stationary body member forming a continuous passage therethrough wherein the conduit member is rotatable within the stationary body. A dual sealing system is employed in which a pair of resilient radial seals are utilized spaced axially along the interface between the stationary member and the conduit member. Any leakage past the first seal is collected through a drain opening in the stationary member between the two radial seals. A container may be attached to the drain opening to indicate and collect any leakage at the rotary joint. In this manner the second seal, then, becomes a pressure seal and the leakage container prevents any possible damage being done by the leakage of corrosive fluids from the system and serves to indicate required maintenance. The rotary joint solves the problem of preventing leakage over a wide temperature range in a low-cost, simple manner.

2 Claims, 3 Drawing Figures

U.S. Patent    Nov. 24, 1981    4,302,033
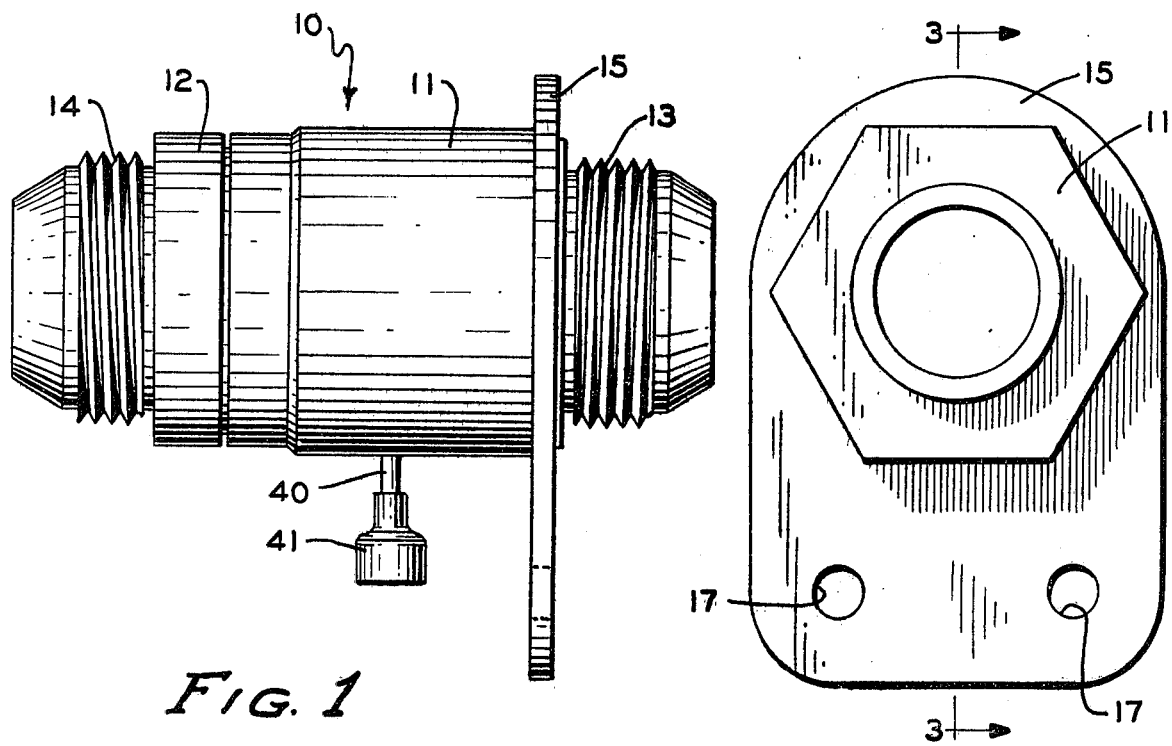
FIG. 1
FIG. 2
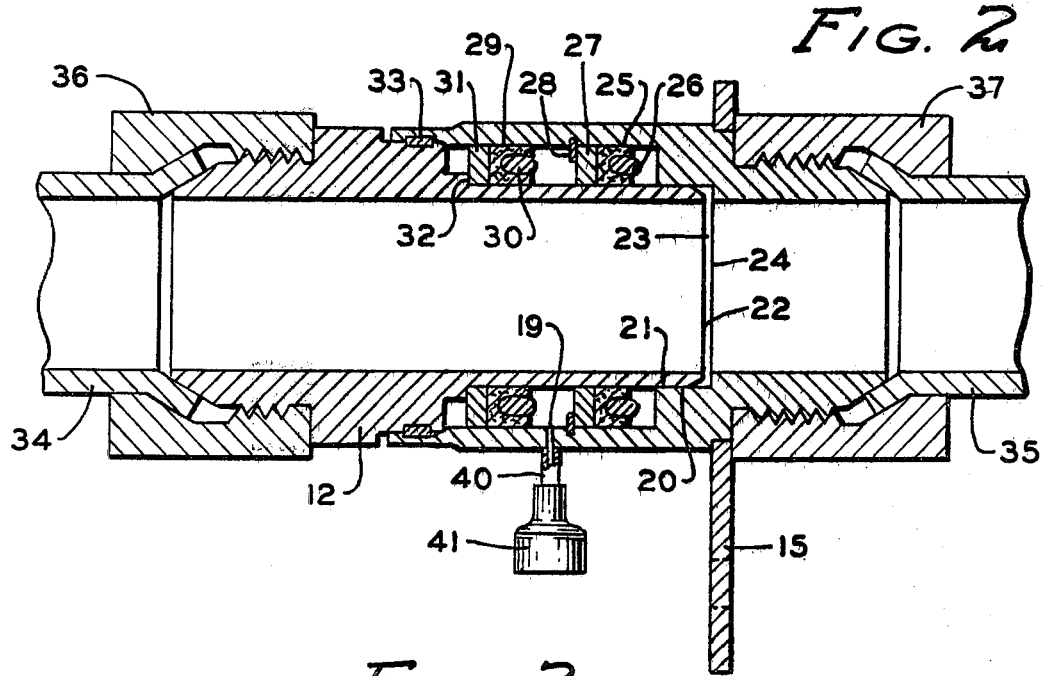
FIG. 3

DUAL-SEAL ROTARY FLUID COUPLING

BACKGROUND OF THE INVENTION

1. Field of the Invention

The present invention relates generally to the field of rotary fluid couplings and, more particularly, to a dual-seal rotary coupling having excellent sealing capabilities over a wide temperature range at low pressure as required in concentrating solar collector applications.

2. Description of the Prior Art

The prior art is replete with numerous types of rotating connectors, couplings or joints, various configurations which have been proposed for providing a reasonably fluid-tight seal at a juncture between a rotating and a stationary fluid conduit. Almost all of the prior art rotary couplings are designed for relatively constant moderate temperatures from about 0° F. to 100° F. In addition, most of these rotary joints are designed for relatively high pressures, i.e., above 1000 psi as in many hydraulic systems. Most of the prior art rotary couplings are sealed by the means of "O" rings or lip type seals and in most situations some leakage is tolerated. For temperatures above 300° F. certain rotary joints have been devised utilizing carbon-faced, spring loaded rotary seals.

One prior art rotary fluid joint utilizing a dual seal is found in a patent to Freize et al., U.S. Pat. No. 3,889,983 issued June 17, 1975 which illustrates and describes the rotary fluid joint for high speed operations which employs a dual seal. The function of the dual seal in that rotary fluid joint is to prevent leakage of the fluid into the high speed bearings operating in conjunction with a fluid slinger which prevents the fluid from reaching the bearings. His system is not concerned with the prevention of leakage per se, any type of a low rotational speed device, or with the detection of leakage.

Because prior art rotary joints have been designed generally for high pressure operation in which the ambient temperature shifts very little during use, the seals associated with such rotary fluid couplings are not effective over a wide range of temperatures such as that required in an outdoor concentrating solar collector system wherein the ambient temperature may vary from as low as −40° F. to −60° F. on a cold winter night in northern Minnesota to about 400° F. under full sunlight when the system is operated on a warm summer day. Also, most fluids utilized as heat transfer mechanisms for solar concentrating collectors such as Therminol 44 (trademark of the Monsanto Chemical Company of St. Louis, Mo.) are corrosive or toxic and any leakage which comes in contact with people or painted surfaces may cause a great deal of damage. Therefore, inasmuch as concentrating solar collector fields are often located on the roofs of buildings or atop parking ramps wherein people and automobiles may pass beneath the collecting field, it is imperative that no leakage of heat transfer fluid occur. Also, inasmuch as the entire piping system of a solar installation of this type typically is covered with up to four inches of thermal insulation, some method of early leak detection which can detect even minute leaks is desirable if possible.

Thus, applications such as the one described require a rotary joint which must operate without leaks in a temperature range from at least −40° F. ambient to +450° F. fully heated. The joint does not have to withstand high speed operation or high pressure but the material of construction, including the seals must be compatible with the selected heat transfer medium.

SUMMARY OF THE INVENTION

By means of the present invention many of the problems associated with prior art rotary fluid couplings which make them unsuited to concentrating solar systems are solved by the provision of a unique dual-seal rotary fluid coupling capable of virtually leak proof operation over a very wide temperature range, i.e., from about minus 65° F. to 550° F. The rotary fluid coupling of the present invention includes a stationary body member which has a hollow interior channel providing a fluid passage in conjunction with a rotatable conduit member, one end of which is received in the stationary body member. A pair of resilient sealing means cooperating with the interface of the inner surface of the stationary member and the outer surface of the conduit member are located spaced axially along that innerface. A vent opening is provided in the bottom of the stationary member such that any fluid leaking past the first of the two radial seals will drain through the vent hole. A container is provided to collect any fluid which drains through the vent opening in a manner which both serves to prevent any leakage of fluid from the system. The container may be used to indicate the fact that leakage is occurring at a very early stage. This, in turn, may be used to initiate maintenance of the joint involved before leaking fluid damages insulation or causes other problems.

The rotary fluid coupling of the invention is a simple, low-cost device which does not require any special bearings or other costly parts and can be readily assembled or disassembled without special tools.

BRIEF DESCRIPTON OF THE DRAWINGS

In the drawings wherein like numerals are utilized to designated like parts throughout the same:

FIG. 1 is a side elevational view of the assembled rotary coupling of the invention;

FIG. 2 is a front elevational view of the assembled coupling of FIG. 1; and

FIG. 3 is a sectional view taken along lines 3—3 of FIG. 2 showing the interior of the rotary coupling as assembled.

DESCRIPTION OF THE PREFERRED EMBODIMENT

In FIG. 1 there is shown a side elevational view of the rotary fluid coupling of the invention. The rotary coupling of the invention is shown generally at 10 and includes a stationary body member 11 which cooperates with a rotatable conduit member 12 to form the main basic parts of the rotary coupling structure. The member 11 is suitably threaded at 13 and the member 12 at 14 to accommodate additional lengths of conduit. As better viewed in FIG. 2, the stationary member 11 includes a flange 15 suitably fixed to the member 11 as by conventional welding or brazing. Mounting holes as at 17 are provided in the member 15 such that the member 11 can be rigidly fixed in the position desired. The flange 15, of course, may also serve as a pipe support for the continuing conduit structure.

The details of the internal structure of the rotary fluid coupling of the present invention are shown in the side elevational sectional view of FIG. 3. As can be seen in that Figure, the rotatable conduit member 12 is basically journalled in the stationary body member 11 wherein the configuration of the internal shoulder diameter as at 20 of the member 11 basically corresponds to the configuration outer diameter 21 of the member 12. Several thousandths of an inch clearance is normally provided. A small gap 22 is provided at the axial juncture of members 11 and 12 such that the end 23 of member 12 does not contact the end 24 of the member 11.

A first radial resilient seal is provided at 25 and includes a resilient member which may be a spring member 26. The member 26 causes the seal 25 to fill the entire radial gap between the members 11 and 12 throughout the required range of temperature and pressure conditions. The seal 25 abutts a seal seat 27 which, in turn, is retained in place as by a snap ring 28. Spaced axially along the interface between the shoulder section of the member 11 and the rotating member 12 is a second resilient seal shown at 29 with integral internal resilient member 30 and associated seal seat 31 which is held in place by the shoulder 32 on the member 12. When assembled member 12 is held in place positioned in the member 11 as by a retainer band 33.

The surfaces 20 and 21 are suitable finished such that the member 12 easily rotates within the member 11. It should be noted that this particular configuration is more suitable for a low duty cycle of rotation of the member 11 relative to the member 12 such as that associated with the focussing of solar concentrating collectors as they follow the path of the sun during the solar day or are occasionally retracted rather than a constant motion high speed application.

The surfaces of members 11 and 12 may be made of mild steel or any other metallic material which is compatible with the particular heat transfer fluid utilized in the system. The seals 25 and 29 with associated integral resilient members 26 and 30 must be such that an effective seal is maintained between member 11 and member 12 throughout the entire expectant range of temperatures from the coldest winter day to the hottest operating temperatures of this solar system on a summer day which may be a range between −60° F. and +450° F. In addition to the wide temperature range, they must also be unaffected by the fluid heat transfer medium. Thus, rubber "O" rings and other typical seals traditionally utilized in high duty cycle moderate temperature applications are unsuitable for the present invention. One successful embodiment, however, utilized BAL-SEALS 307 (which may be obtained from the Bal-seal Engineering Company of Santa Ana, Calif. This seal is basically of a carbon-impregnated polymer material such as Teflon (Trademark of E. I. Du Pont de Nemours & Company of Wilmington, Del.) with a suitably resilient spring integrally mounted within the seal. The seal seats 27 and 31 may be made of any suitable steel material or other metallic material which is also compatible with the heat transfer fluid to be used. This is also true of snap ring 28 and the retainer band or retainer 33 may be of ordinary mild steel or stainless steel if desired for corrosion resistance.

Shown in phantom in FIG. 3 are additional conduit members as at 34 and 35 held as by nuts 36 and 37 which would attach to the rotary joint of the invention thus continuing the fluid conduit system in any manner desired. In a solar installation, there normally are two rotary joints associated with each row of collectors as all collectors in one row are normally operated in unison. Thus the ends of the conduit for each row would be suitably pivotally mounted such that the concentrating collectors could follow the path of the sun.

In operation, the rotatable member 12 is caused to rotate slowly within the stationary member 11 in accordance with adjustments to the disposition of the solar collectors involved. The seal 25 must be tight enough so that little or no leakage of the fluid which penetrates the interface between members 11 and 12 can get past. If, however, some slight leakage does take place, the then vent opening 19 and associated conduit 40 are provided to drain any leakage into a suitable container as at 41. Of course other detection methods and fluid retaining systems may be used. Normally, in such an installation the rotary joint 10 and non absorbing portions of the conduit system are covered with a thick layer of insulation (not shown) to help retain the heat absorbed from the solar system by the fluid and therefore slight leaks would go unnoticed under normal circumstances. This could lead to insulation damage or even a fire hazard. By utilizing a detecting device as by making the container 41 transparent, any leakage past the seal 26 can be visually noted and necessary maintenance performed on the leaking rotary joint before any damage is done to the insulation as all the leaked fluid will collect in the chamber 41. The additional seal 29 provides a pressure seal between the fluid pressure internal to the conduit and the outside ambient atmospheric pressure and allows the use of the easily assembled retainer band 33 in the system. It is also possible to pressurize the container 41 such that leakage due to pressure differential across the seals 25 may be further minimized.

Thus, as can be seen from the above, the present invention contemplates a simple very effective rotary joint for use over a wide range of ambient temperatures. It may be noted from the construction of the rotary coupling of the invention that it can be rather easily assembled and disassembled without the use of heavy wrenches or special tools as the rings can be snapped in and out in place with pliers or the like allowing any necessary replacement of parts and for ease of original assembly.

The embodiments of the invention in which an exclusive property or right is claimed are defined as follows:

1. A dual seal rotary fluid coupling comprising:
   stationary body member having a hollowed interior defining an axial fluid passage;
   a rotatable conduit member having one end journalled in the stationary body member, and forming therewith a continuous fluid passage;
   a pair of substantially fluid tight resilient radial sealing means cooperating with the interface of the inner surface of the stationary member and the outer surface of the rotatable member spaced axially along said interface, wherein each of said sealing means further comprises a polymer material having an integrally mounted spring member such that resiliency is maintained in the temperature range of from approximately −60° F. to +450° F.;
   vent drain means in said stationary body member in communication with the outer surface of said conduit member and disposed between said pair of sealing means for draining any fluid escaping said sealing means; and
   retaining band means for retaining said rotatable member in said stationary member.

2. The rotary fluid coupling of claim 1 wherein said polymer material is carbon-impregnated polytetrafluoroethylene.

* * * * *